United States Patent [19]

Riehl et al.

[11] Patent Number: 4,742,813
[45] Date of Patent: May 10, 1988

[54] SUNSHIELD DEVICE

[75] Inventors: Horst Riehl, Rodsch; Thomas Nebhuth, Coburg; Christian Bartenbach, Munich, all of Fed. Rep. of Germany; Martin Klingler, Innsbruck, Austria

[73] Assignee: Siemens Aktiengesellschaft, Berlin and Munich, Fed. Rep. of Germany

[21] Appl. No.: 857,730

[22] Filed: Apr. 29, 1986

[30] Foreign Application Priority Data

Apr. 30, 1985 [DE] Fed. Rep. of Germany ....... 3515581

[51] Int. Cl.$^4$ ................................................. F24J 2/38
[52] U.S. Cl. ............................. 126/425; 126/DIG. 1; 353/3
[58] Field of Search ............. 126/425, 419, DIG. 1; 250/203 R; 353/3; 350/443

[56] References Cited

U.S. PATENT DOCUMENTS

| 2,022,144 | 11/1935 | Nicolson | 353/3 |
| 2,712,772 | 7/1955 | Trombe | 353/3 |
| 4,154,219 | 5/1979 | Gupta et al. | 353/3 X |
| 4,314,546 | 2/1982 | Miller | 353/3 X |
| 4,439,020 | 3/1984 | Maruko | 353/3 X |
| 4,484,565 | 11/1984 | Mori | 353/3 X |
| 4,517,960 | 5/1985 | Bartenbach | 126/440 |

FOREIGN PATENT DOCUMENTS

1286735 1/1969 Fed. Rep. of Germany .

Primary Examiner—Randall L. Green

[57] ABSTRACT

A signal generator equipped with a shading device and two light sensors is arranged on the upper side of a slat equipped with retro-reflective prisms and rotatable about a longitudinal axis. Depending upon the sun's position relative to the slat, the light sensors are variously shaded or illuminated by means of the shading device, and when the slat is rotated about its longitudinal axis, the light sensors supply electrical code values which change in opposing directions. A difference between the code values is fed via an amplifier to a servomotor which rotates the slat about its longitudinal axis until the plane of incidence of the sun's rays, which passes through the longitudinal axis, is at right angles to the upper side of the slat. This ensures that sun's rays which hit the slat are reflected regardless of the sun's position, the time of year, and the alignment of the facade plane in which the slat is arranged.

6 Claims, 6 Drawing Sheets

SUNSHIELD DEVICE

BACKGROUND OF THE INVENTION

The invention relates to a sunshield device for a window opening in a facade plane.

A sunshield device of this kind, which is known from U.S. Pat. No. 4,517,960, incorporated herein by reference, has a relatively small blocking zone. Compared with the previously known, retro-reflective sunshield devices, it allows a large amount of Zenith light to enter the room behind it, and nevertheless requires only slight adjustment during the course of the day and the seasons.

SUMMARY OF THE INVENTION

An object of this invention is to alternate this adjustment using simple means.

According to the invention, basically a signal generator is provided comprising a shading device and two light sensors arranged on at least one slat within a facade plane in such manner that when the slat is rotated about its longitudinal axis, the electrical code values of the light sensors change in opposing directions. The slat is adjusted by means of a servo-motor controlled via an amplifier device in dependence upon the difference between the values of a parameter of the two light sensors.

Here, photo-cells, light-sensitive resistors, phototransistors, or the like can be used as light sensors. Preferably the sensors, together with additional resistors, form a bridge circuit whose output is connected to the input of the amplifier device. This bridge circuit—and likewise the amplifier device and the servo-motor—can be fed by additional photo-cells on the slat.

It is within the scope of the invention that all the slats which are arranged in the same facade plane of a building, whose longitudinal axes extend parallel to one another, and should be driven by means of servo-motors in dependence upon one single signal generator on one of these slats. Since these slats are all exposed to the same sun radiation, they are also all subject to the same optimum adjustment position. One single servo-motor can be provided for all the slats arranged in the same window opening, and can be coupled to all the slats, for example, via a chain drive.

The invention obviously easily permits slats of this kind in differently-orientated facade planes of a building to be adjusted separately from one another in optimum fashion in accordance with the path of the sun. Here it is advantageous to arrange a switch-over device between the amplifier device, which controls the servo-motors of all the slats in a facade plane, and the signal generator assigned to this facade plane. In this way it is possible to interrupt the control circuit, and by imposing an arbitrarily variable control voltage, to adjust all the slats of this facade plane to a specified angle of inclination. The sunshield device can then also be adjusted to be such that the sun's rays fully enter the room behind the window opening, and thus—for example during winter—can also be used to heat the building.

The shading device preferably comprises a partition wall which extends between its top panel and the upper side of the slat and which extends between the two light sensors. This serves to increase the sensitivity of the signal generator, i.e. the level of the oppositely-directed change in the electrical values relative to a specific change in the angle of inclination of the slat. Extremely favorable conditions are achieved if the partition wall is arranged at right angles to the upper side of the slat and to the top panel, and if the shading device is designed to be symmetrical with the partition wall.

The highest level of sensitivity is achieved if the partition wall is arranged parallel to the longitudinal axis of the slat and the center points of the light sensors are arranged, at an equal distance from the partition wall, on a transverse line which is at right angles to the longitudinal axis. In this way, the top panel can be flat and can extend at a constant distance parallel to the upper side of the slat. However, an arrangement of this kind results in the optimum level of sensitivity only when the longitudinal axes of the slats extend in the north-south direction, i.e. at right angles to the plane of the sun's path.

In order to always achieve the maximum level of sensitivity regardless of the particular alignment of a facade plane to the sun's path, in accordance with a further development of the invention, the top panel is curved and the transverse edges of the top panel can be brought down to the upper side of the slat.

DESCRIPTION OF THE PREFERRED EMBODIMENTS

Figures 1, 2:
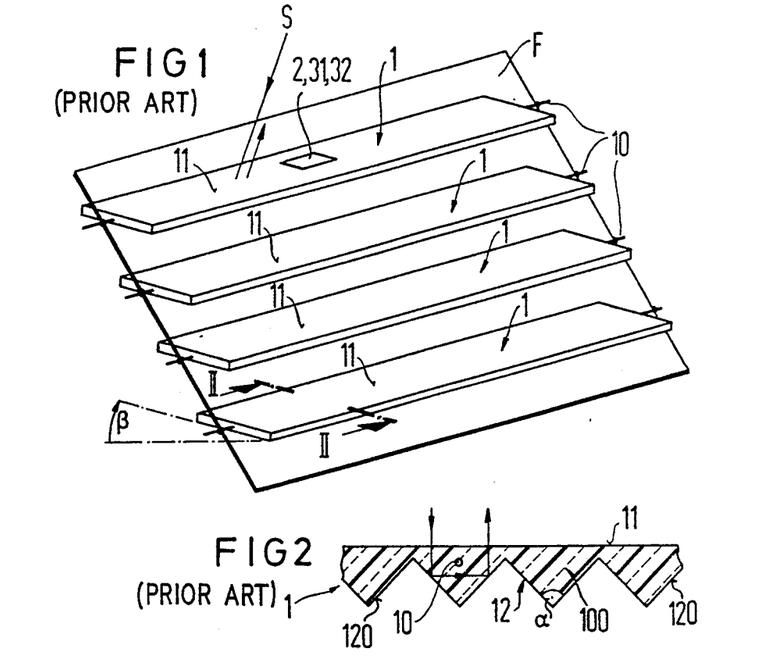
FIG. 1 is a schematic, perspective view of a window opening F containing slats.
FIG. 2 is a cross-section along line II—II through a slat in accordance with FIG. 1.

The sunshield device illustrated in FIG. 1 and 2, and which is known per se, consists of a plurality of slats 1 arranged in a window opening F so as to be rotatable about a longitudinal axis 10. Each slat consists of refractive material, for example synthetic material, and has the cross-section shown in FIG. 2. It has a flat upper side 11 which faces towards the sun's rays S (see FIG. 1). On the underneath side, prisms 100 are juxtaposed without gaps, which extend parallel to the longitudinal axis 10 and are delimited by catheti 120 and the upper side 11 as the hypotenuse. Transversely to the longitudinal axis 10, the individual prisms have the cross-section of an isosceles triangle, where the inner angle α between the catheti is selected to be such that the sun's rays which hit the upper side 11 are re-reflected outwardly—under conditions which are yet to be described—and thus cannot enter the room behind the window opening F. One of the conditions of this "retro-reflection", which is based on the principle of total reflection, is that the inner angle α should be equal to 90°±3°, depending upon the material.

Figure 3:
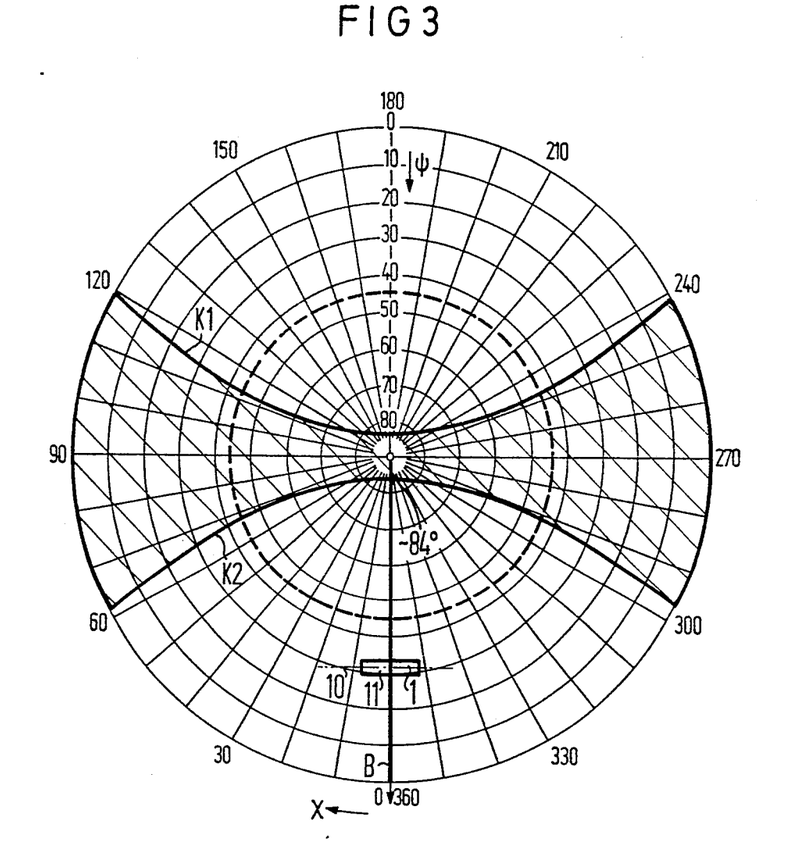
FIG. 3 is the reflection diagram of a slat in accordance with FIG. 1.

FIG. 3 is the reflection diagram of a slat corresponding to FIG. 1 and 2 with an inner angle α of 90°. The radial direction plots the angles of "azimuth planes" which extend at right angles to the upper side 11 of the slat. The azimuth angles X of these planes are calculated from the reference line B which extends at right angles to the longitudinal axis 10 of the slat.

The height angles ψ of 0° to 90° are plotted in concentric circles. In the reflection diagram, the blocking zone of the slat has been shown shaded and delimited by boundary curves K1 and K2. Thus, an azimuth angle X and a height angle ψ are assigned to each point located in the blocking zone. All the beams which hit the upper side 11 of a slat and whose parameters X and ψ lie within the blocking zone are totally reflected. All those light beams which hit the upper side with parameter combinations which lie outside of the blocking zone are allowed to pass into the interior of the room. The width of the blocking zone decreases in accordance with an increasing deviation of the inner angle α from 90°.

Figure 4:
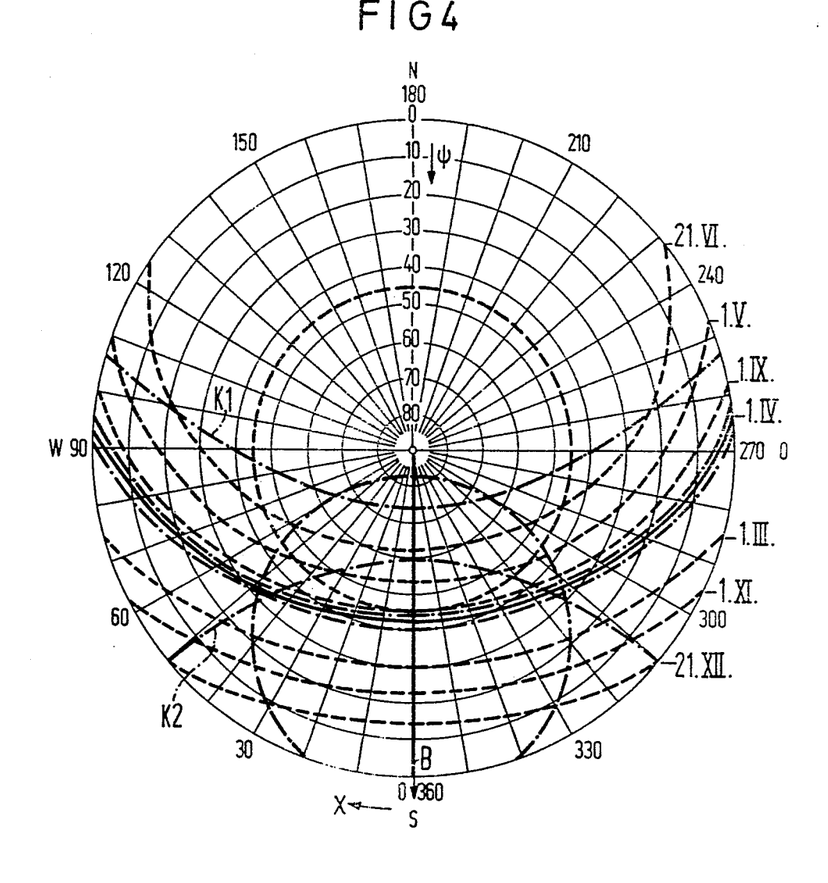
FIG. 4 is a diagram of the sun's position.

FIG. 4 is a sun's position diagram represented in the same form as FIG. 3. Here the path curves of the sun have been plotted for different days of the year. Each path curve results in the associated height angle X for each azimuth angle ψ.

FIG. 4 also represents, in dash-dot form, the blocking zone of a slat in a vertical facade plane which is orientated precisely to the south so that the largest possible section of the path curve of the 21st of June falls into the blocking zone. For this purpose, the slat is rotated in such manner that its reference line B points exactly to the south. A parallel displacement towards the south was also necessary, and was achieved by rotating the slat about its longitudinal axis by the angle of inclination β from the horizontal plane, which also involves some change in the boundary curves K1, K2 of the blocking zone.

It can be seen from FIG. 4 that, in the case of the sunshield device as shown in FIG. 1, during the day practically no adjustment is necessary since the path curve lies outside of the blocking zone only during the early morning hours and in the late evening hours. However, during the year a parallel displacement of the blocking zone, and thus a change of the angle of inclination β of the slats, is necessary.

In order to alternate this adjustment with respect to changing the angle of inclination β, the slats 1 in FIG. 1 are adjustable by a servo-motor (not shown), or a plurality of servo-motors assigned to each slat. The servo-motor or servo-motors are controlled by an amplifier (likewise not shown) which, at its input, receives a different signal from a signal generator (2, 31, 32) on the upper side 11 of one of the slats 1.

Figure 5:
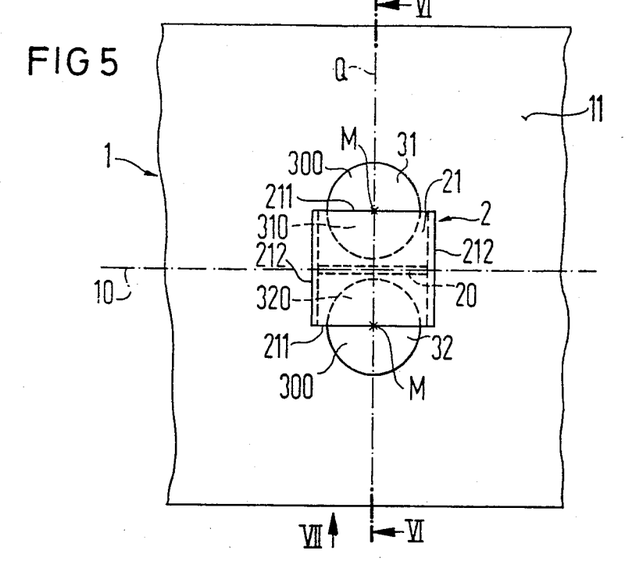
FIG. 5 is a plan view of a section of a slat, with a signal generator.
Figures 6, 7:
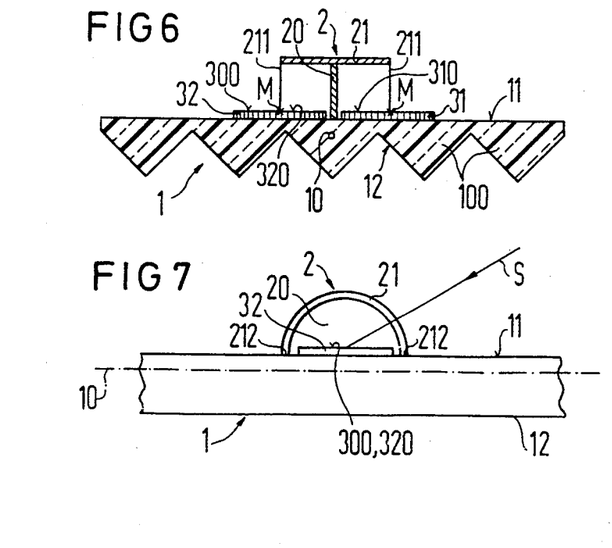
FIG. 6 is a cross-section along the line VI—VI in FIG. 5.
FIG. 7 is a side view of the signal generator in FIG. 5 in the direction of the arrow VII.

The construction of this signal generator is shown in detail in FIGS. 5 to 7. It is designed to be symmetrical to a plane which is at right angles to the upper side 11 of the slat 1 and extends in parallel to the longitudinal axis thereof, which it preferably passes through. The signal generator fundamentally consists of a shading device 2 having a top panel 21 which is delimited by longitudinal edges 211 and transverse edges 212, and of a partition wall 20 which is at right angles to the top panel and which divides the shading device 2 into two identical halves. The top panel 21 is curved, preferably in semi-circular fashion, so that its transverse edges 212 rest on the upper side 11 of the slat 1 (see FIG. 7).

In FIG. 5 the top panel 21 has been shown projected at right angles to the upper side 11. Thus, the longitudinal and transverse edges 211 and 212 respectively simultaneously define a rectangular shading zone of the shading device on the upper side 11 given light projected from above the top panel.

Two light sensors 31, 32, for example in the form of light-sensitive resistors having circular sensor surfaces 300, are arranged on both sides of the partition wall 20 in such manner that the center points M of the sensor surfaces are located at an equal distance from the partition wall 20 on a transverse line Q which extends at right angles to the longitudinal axis 10. The spacing of these center points M is now selected to be such that equal-sized sub-surfaces 310, 320 of the two light sensors are located in the shading zone of the shading device 2.

If it is assumed that the sun's rays S which hit the upper side 11 always lie in a reference plane at right angles to the upper side 11 and which extends in parallel to the longitudinal axis 10, then the unshaded sub-surfaces of the two light sensors receive virtually equal amounts of energy and will therefore exhibit the same electrical code values. Thus, they will either have the same resistance or will supply the same photo-voltage. If, however, the sun's rays travel out of this reference plane, then one of the sensors will receive more light than the other, so that their electrical values will change in opposing directions, where the sign of the change is dependent upon the direction in which the sun moves out of the reference plane. This information is now analyzed by difference formation—in the case of photo-resistors, by means of a bridge circuit—in order to form a control value which is fed to the amplifier device in order to control the servo-motor. The servo-motor then changes the angle of inclination β of the slat until the two light sensors again have the same electrical code values, and therefore the amplifier no longer receives a resultant control value.

Figure 8:
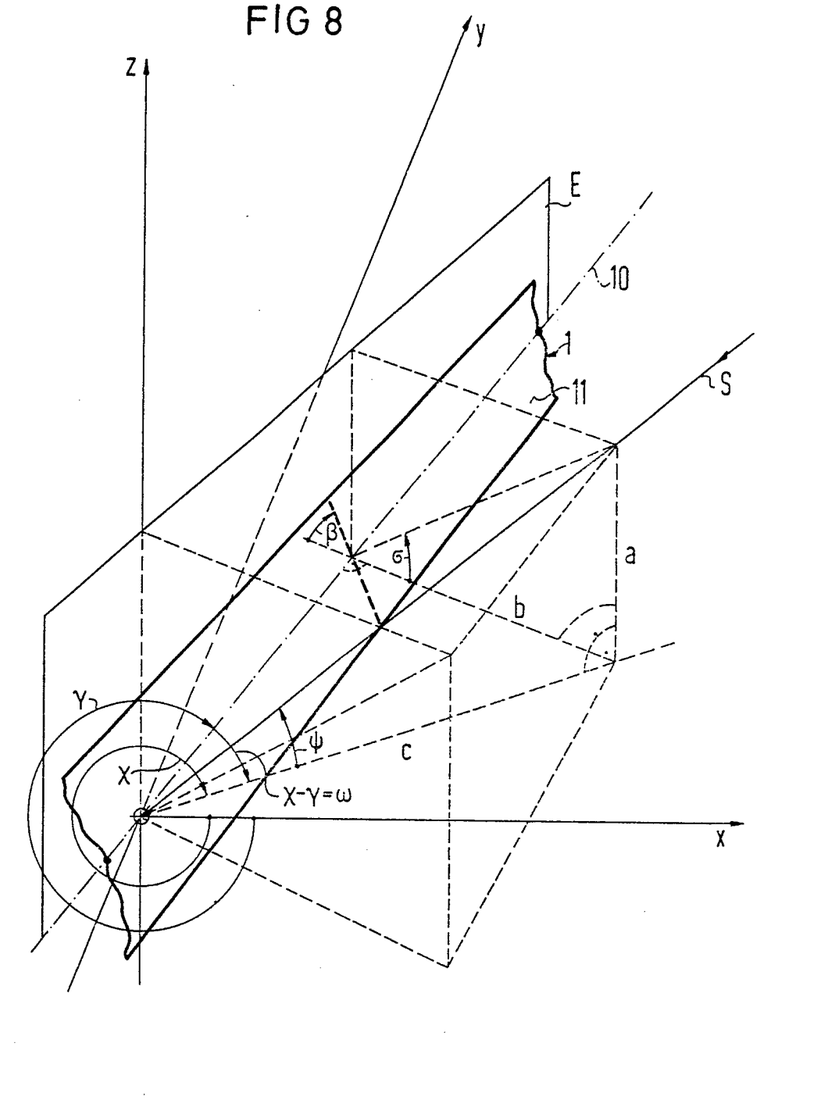
FIG. 8 is a coordinate system showing specification values for the angle of inclination of a slat in an arbitrarily orientated facade plane.

The invention is based on the fact that, regardless of the orientation of the facade plane, the angle of inclination β of a slat can always be adjusted to be such that the sun's rays lie in the reference plane. Here attention is drawn to FIG. 8 in which a facade plane E with an azimuth angle γ, measured from the south direction, is plotted in a coordinate system x, y, z whose x-axis is orientated to the south. Also shown is a slat 1 with its longitudinal axis 10 in the facade plane E and its angle of inclination β to the horizontal plane, and a sun's ray S with an azimuth angle X and a height angle ψ. In order that the sun's ray S should lie in the reference plane which passes through the longitudinal axis 10 and is at right angles to the upper side 11 of the slat 1, the angle of inclination β must be calculated from the equation $$tg(\beta + 90°) = \frac{tg\, \psi}{\sin(X - \psi)}$$

where X and ψ are the azimuth angle and height angle respectively of the sun's ray S and γ is the azimuth angle of the facade plane E.

As the explanation of the embodiment with reference to FIGS. 5 through 7 has shown, with the invention the light components incident upon the two light sensors are dependent on the angle of inclination of the light rays relative to the upper side 11. The shading device 2 thus acts in practice as an angle-dependent "light divider".

In the exemplary embodiments set forth, the light division is essentially based on a shading. In accordance with a further embodiment of the invention, however, an active light divider can also be employed, this active light divider steering the different light components onto the two light sensors dependent on the angle of inclination of the light rays relative to the upper side 11. Such an exemplary embodiment shall be set forth in greater detail with reference to FIGS. 9 through 11.

Figure 9:
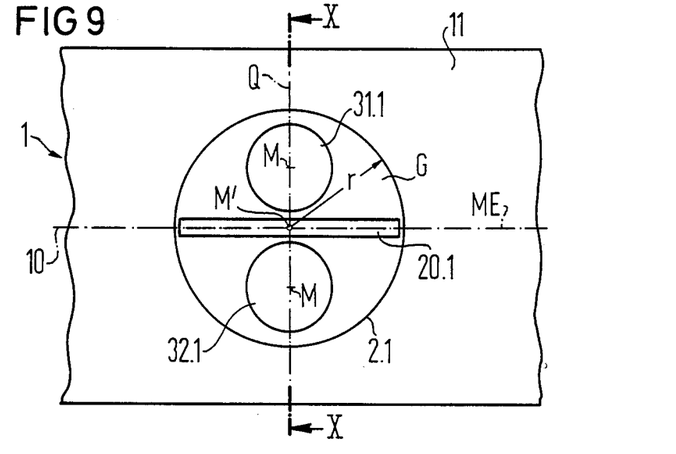
FIG. 9 is a plan view of a slat similar to FIG. 5.
Figure 10:
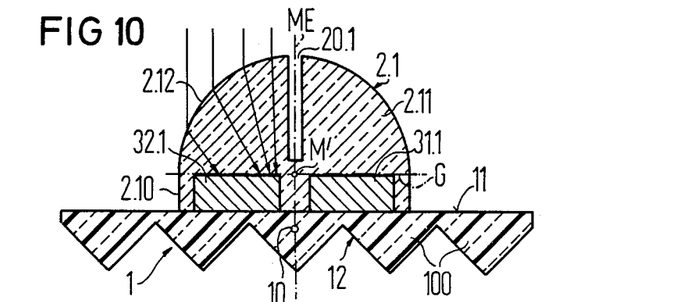
FIG. 10 is a cross section comparable to that in FIG. 6.
Figure 11:
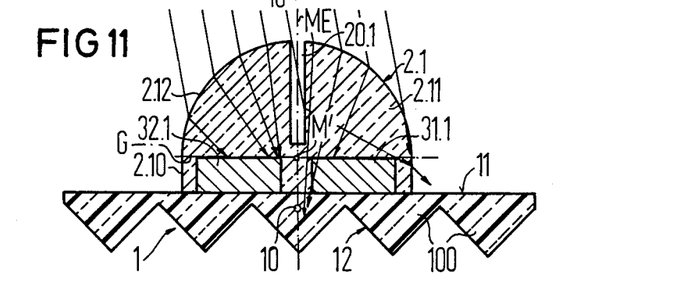
FIG. 11 is a cross section in accordance with FIG. 10 having a divergent inclination of the incident light rays.

A deflection means in the form of a hemisphere 2.1 of light-refractive material, especially of "plastic glass", serves as a light divider in the embodiment explained by FIGS. 9–11. This hemisphere has a circular base area G comprising the radius r around the center M' of the sphere. A center plane ME proceeds through the center M' of the sphere. A center plane ME proceeds through the center M' of the sphere at right angles to this base area G. A barrier slot 20.1 proceeds at both sides of the center plane ME and parallel thereto. This barrier slot 20.1 extends over at least 50% of the radius r from the outside surface in the direction toward the center M' of the sphere. This parting gap can be additionally filled with a light-impermeable material.

The hemisphere 2.1 is applied to the upper side 11 of the vane or lamella 1 such that the base area G proceeds parallel to the upper side 11 and the center plane ME proceeds at right angles to the upper side 11 and through the longitudinal axis 10.

Two photodiodes 31.1 and 32.1 are arranged equidistant from the center plane ME as light sensors. They are arranged such that their centers lie on a transverse line Q which proceeds at a right angle to the longitudinal axis 10 and through the center M' of the sphere. The light-sensitive surfaces of the photodiodes lie against the base area G of the hemisphere 2.1. In particular, the photodiodes are arranged in corresponding recesses in a cylinder section 2.11 which adjoins the base area G of the hemisphere.

Due to the symmetry of the arrangement relative to the center plane ME and relative to the transverse line Q (FIG. 9), the two photodiodes receive identical light components as long as the light rays proceed parallel to the center plane (FIG. 10). The two photodiodes therefore supply practically identical signals.

This symmetry, however, is disturbed as soon as the light rays describe a small angle with the center plane ME, as shown in FIG. 11. Here, the photodiodes receive different light components and accordingly supply different output signals which are used for the readjustment of the slats 1 in the same way as set forth with reference to the exemplary embodiment of FIGS. 5 through 7.

Although various minor changes and modifications might be suggested by those skilled in the art, it will be understood that we wish to include within the claims of the patent warranted hereon all such changes and modifications as reasonably come within our contribution to the art.

We claim as our invention:

1. A sunshield device for a window opening in a facade plane, comprising:
    at least one slat formed of light-refractive material arranged in the window opening so as to be rotatable about a longitudinal axis;
    the at least one slat having a flat upper side and on its underneath side is provided with prisms arranged one beside another without gaps;
    the prisms extending parallel to the longitudinal axis and having the form of an isosceles triangle in a cross-sectional plane at right angles to the longitudinal axis;
    a hypotenuse of the triangle being formed by the flat upper side and a catheti forming an inner angle with which a retro-reflection condition is fulfilled;
    said at least one slat having on its upper side a signal generator with a shading means for two light sensors, a parameter of the light sensors having an electrical value which is dependent upon a size of an irradiated surface of the respective sensor and an intensity of the radiation;
    the shading means being provided with a top panel spaced from the upper side of the slat and which defines opposite longitudinal edges and opposite transverse edges so that given projection of light from above the top panel onto the upper side, a rectangular shading zone is defined on said upper side;
    the two light sensors being arranged adjacent to one another on the upper side in such manner that their center points are located on different parallels to the longitudinal axis;
    partial surfaces of the sensor surfaces of the two light sensors adjacent one another being located in the shading zone; and
    the slat being coupled to a servo-motor which is itself connected to an ouput of an amplifier controlled at its input end in dependence upon a difference between the electrical values of the parameters of the two light sensors.

2. A sunshield device according to claim 1 wherein the shading device comprises a partition wall which extends between the upper side of the slat and the top panel, and which passes between the two light sensors.

3. A sunshield device according to claim 2 wherein the partition wall extends at right angles to the upper side of the slat and to the top panel, and the shading device being designed to be symmetrical to the partition wall.

4. A sunshield device according to claim 3 wherein the partition wall extends in parallel to the longitudinal axis of the slat and the center points of the light sensors are located at an equal distance from the partition wall on a transverse line which is at right angles to the longitudinal axis.

5. A sunshield device according to claim 4 wherein the top panel extends in the form of a curve between two transverse edges with which the shading device rests on the upper side of the slat.

6. A sunshield device for a window opening in a facade plane, comprising:
    at least one slat formed of a light-refractive material arranged in the window opening so as to be rotatable about a longitudinal axis;
    the at least one slat having a flat upper side and on its underneath side is provided with prisms arranged one beside another;
    the prisms extending parallel to the longitudinal axis and having the form of a triangle;
    said at least one slat having on its upper side a signal generator with a shading means for two light sensors, a parameter of the light sensors having an electrical value which is dependent upon a size of an irradiated surface of the respective sensor and an intensity of the radiation;

the shading means being provided with a top panel spaced from the upper side of the slat;

partial surfaces of the sensor surfaces of the two light sensors adjacent one another being located in the shading zone;

a partition wall between the upper side of the slat and the top panel, and aligned parallel to said longitudinal axis and between the light sensors; and the slat being coupled to means for moving the slat dependent upon signals from the two light sensors.

* * * * *